United States Patent
Bourne et al.

(10) Patent No.: US 12,282,381 B2
(45) Date of Patent: Apr. 22, 2025

(54) DETERMINING ORIGINS OF MEMORY LEAKS IN SOURCE CODE

(71) Applicant: International Business Machines Corporation, Armonk, NY (US)

(72) Inventors: Donald Alexander Bourne, Toronto (CA); Kevin Grigorenko, San Diego, CA (US); Gireesh Punathil, Kannur (IN)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 18/151,506

(22) Filed: Jan. 9, 2023

(65) Prior Publication Data

US 2024/0231988 A1 Jul. 11, 2024

(51) Int. Cl.
*G06F 11/07* (2006.01)
(52) U.S. Cl.
CPC ...... *G06F 11/0778* (2013.01); *G06F 11/0772* (2013.01)
(58) Field of Classification Search
None
See application file for complete search history.

(56) References Cited

U.S. PATENT DOCUMENTS

| | | | |
|---|---|---|---|
| 7,313,661 B1 | 12/2007 | Dmitriev | |
| 9,760,464 B1* | 9/2017 | Helliwell | G06F 11/3037 |
| 9,824,005 B1* | 11/2017 | Helliwell | G06F 12/023 |
| 10,534,643 B2 | 1/2020 | Chan | |
| 11,080,125 B1 | 8/2021 | Raj | |
| 2007/0074149 A1* | 3/2007 | Ognev | G06F 11/366 717/126 |
| 2008/0046673 A1* | 2/2008 | Hwang | G06F 12/023 711/170 |
| 2008/0072007 A1 | 3/2008 | Zagatta | |
| 2008/0209404 A1* | 8/2008 | Brady | G06F 11/366 717/128 |

(Continued)

OTHER PUBLICATIONS

Viorel Alexandru; "Memory Dumps to Study a Memory-Leak Performance Issue"; Microsoft.com Techcommunity Blog [Full URL found in ref.]; Jul. 23, 2021 (Year: 2021).*

(Continued)

*Primary Examiner* — Qing Chen
*Assistant Examiner* — Clint Thatcher
(74) *Attorney, Agent, or Firm* — Monchai Chuaychoo

(57) ABSTRACT

A computer-implemented method, a computer program product, and a computer system for determining origins of memory leaks in source code. A computer system writes a first memory dump, in response to a memory leak being detected. A computer system searches the first memory dump to determine types of suspect leaking collections. A computer system creates identifiers for respective instances of each of the types. A computer system writes a second memory dump, in response to a continued memory leak being detected. A computer system determines which unique identifiers from the second memory dump correspond to growing collection objects of the types. A computer system tracks code paths of calls that add objects to collections whose identifiers match one of the unique identifiers. A computer system logs the code paths for review by developers.

17 Claims, 3 Drawing Sheets

(56) References Cited

U.S. PATENT DOCUMENTS

| | | |
|---|---|---|
| 2008/0294936 A1* | 11/2008 | Hogstrom ............. G06F 11/366 |
| | | 714/6.13 |
| 2009/0328007 A1 | 12/2009 | Chen |
| 2014/0189438 A1 | 7/2014 | Arbel |
| 2016/0055043 A1 | 2/2016 | Chikabelapur |
| 2016/0070633 A1* | 3/2016 | Abraham ............. G06F 9/5016 |
| | | 714/47.3 |
| 2016/0321130 A1 | 11/2016 | Takamiya |
| 2017/0277623 A1 | 9/2017 | Kawachiya |
| 2017/0337085 A1 | 11/2017 | Chan |

OTHER PUBLICATIONS

"C# and C++ Memory Leak Detector—Memory Validator 9.50"; SoftwareVerify.com wepage as captured by the Wayback Machine Internet Archive (archive.org) [full URL found in ref.] on Dec. 12, 2022 (Year: 2022).*

Disclosed Anonymously, "Faster detection of Java memory leak from a huge heap dump", An IP.com Prior Art Database Technical Disclosure, IP.com No. IPCOM000217107D, IP.com Electronic Publication Date: May 3, 2012, 5 pages.

\* cited by examiner

DETERMINING ORIGINS OF MEMORY LEAKS IN SOURCE CODE

BACKGROUND

The present invention relates generally to memory leaks, and more particularly to determining origins of memory leaks in source code by observing a running system.

Memory leaks are very common. For example, a support team of the IBM WebSphere Application Server is asked to help customers with approximately 50 memory leak issues per month. The memory leak or exhaustion primarily originates from poorly developed program parts including the application, dependent libraries, and even parts of the runtime engine. Memory leaks result in additional usage of memory by the application, and they also affect the efficiency and performance of transactions carried out by the application. An unbounded leaking system can lead to site reliability issues. There are tools available today to help application owners determine that their applications have memory leaks and what kind of objects are being leaked.

U.S. Pat. No. 11,080,125 discloses a system which relies on comparing call stacks in multiple dumps taken at the moments when the server has run out of memory. One disadvantage of the approach is that a call stack causing the server to run out of memory is not always a call stack responsible for a memory leak. Another disadvantage is that the approach requires the server to have crashed (potentially multiple times) in order to determine a source causing a memory leak.

U.S. Pat. No. 10,534,643 discloses a system which relies on correlating time spans where memory use is above a threshold with thread call stacks collected during the same time spans. This disclosed approach may not be able to uniquely determine a cause of a memory leak, as there will often be a large number of threads executing in a server at the same time and most will not be responsible for the memory leak.

SUMMARY

In one aspect, a computer-implemented method for determining origins of memory leaks in source code is provided. The computer-implemented method includes, in response to a memory leak being detected, writing a first memory dump. The computer-implemented method further includes searching the first memory dump to determine types of suspect leaking collections. The computer-implemented method further includes creating unique identifiers for respective instances of each of the types. The computer-implemented method further includes, in response to a continued memory leak being detected, writing a second memory dump. The computer-implemented method further includes determining which unique identifiers from the second memory dump correspond to growing collection objects of the types. The computer-implemented method further includes tracking code paths of calls that add objects to collections whose identifiers match one of the unique identifiers. The computer-implemented method further includes logging the code paths for review by developers.

In another aspect, a computer program product for determining origins of memory leaks in source code is provided. The computer program product comprises a computer readable storage medium having program instructions embodied therewith, and the program instructions are executable by one or more processors. The program instructions are executable to, in response to a memory leak being detected, write a first memory dump. The program instructions are further executable to search the first memory dump to determine types of suspect leaking collections. The program instructions are further executable to create unique identifiers for respective instances of each of the types. The program instructions are further executable to, in response to a continued memory leak being detected, write a second memory dump. The program instructions are further executable to determine which unique identifiers from the second memory dump correspond to growing collection objects of the types. The program instructions are further executable to track code paths of calls that add objects to collections whose identifiers match one of the unique identifiers. The program instructions are further executable to log the code paths for review by developers.

In yet another aspect, a computer system for determining origins of memory leaks in source code is provided. The computer system comprises one or more processors, one or more computer readable tangible storage devices, and program instructions stored on at least one of the one or more computer readable tangible storage devices for execution by at least one of the one or more processors. The program instructions are executable to: in response to a memory leak being detected, write a first memory dump; search the first memory dump to determine types of suspect leaking collections; create unique identifiers for respective instances of each of the types; in response to a continued memory leak being detected, write a second memory dump; determine which unique identifiers from the second memory dump correspond to growing collection objects of the types; track code paths of calls that add objects to collections whose identifiers match one of the unique identifiers; and log the code paths for review by developers.

DETAILED DESCRIPTION

Figure 1:
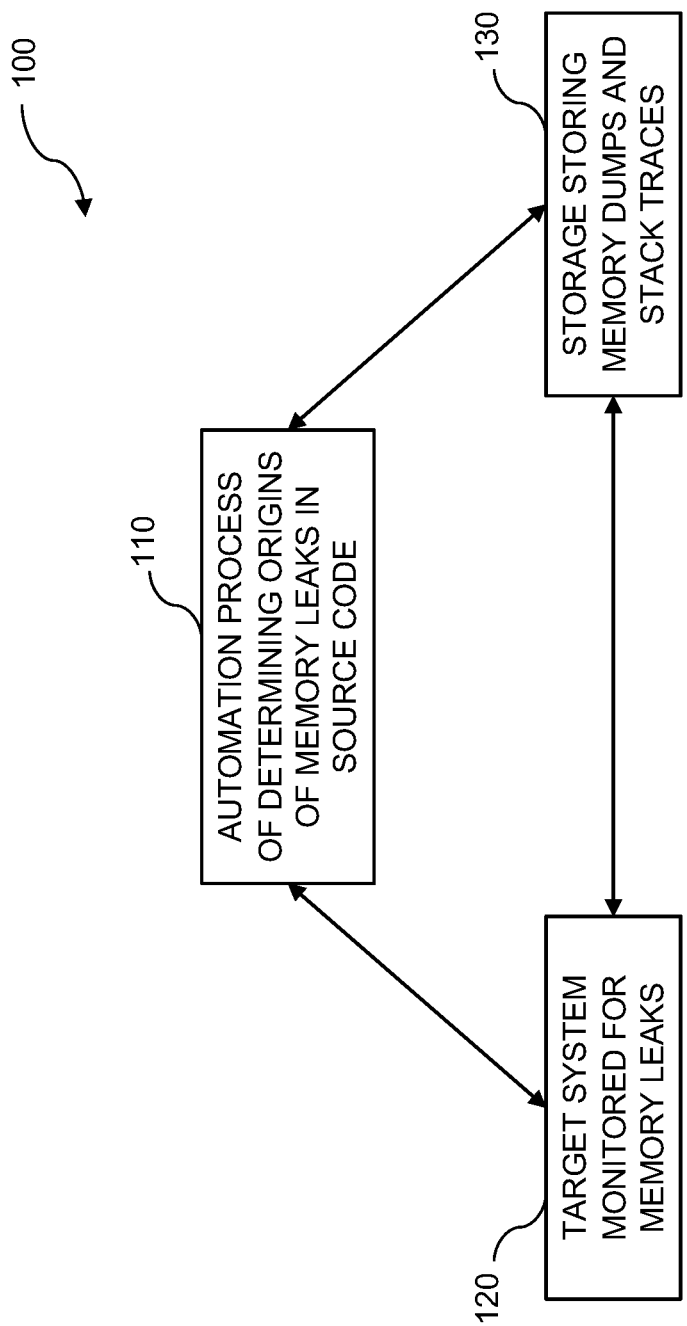
FIG. 1 is a diagram illustrating a system for determining origins of memory leaks in source code, in accordance with one embodiment of the present invention.

Memory leak investigations typically involve three stages. First, memory leaks must be detected. It is not uncommon for runtimes to be able to indicate when they have run out of memory. Tools exist to post-process memory stats to help look at memory usage trends. Second, the size and type of objects being leaked must be found. Currently existing tools help with this problem. Third, applications must be analyzed to determine what code paths are causing the leak to occur. This third problem is not well addressed by current technologies. Embodiments of the present invention provide a way to quickly determine which code paths in the applications contribute to the memory leaks.

The task of identifying the code that is responsible for the memory leaks in an application is difficult today, by virtue of the limited diagnostic information. Runtimes, such as the Java runtime, typically indicate when a process runs out of memory. Through analysis of a heap dump or core file taken from the runtime, existing tools are able to determine what kinds of objects are accumulating in the heap dump and what references in memory are responsible for keeping the objects from being garbage collected. Often, these leak suspects are just a collection of common objects such as characters, and often they are held in memory in a generic collection structure such as a HashMap. With this limited diagnostic information, it can be difficult for the application owner to know what code is responsible for contributing to the memory leaks.

The purpose of the present invention is to help application owners determine what parts of their code contribute to memory leaks by determining and reporting the specific call stacks of the code responsible for the memory leaks. The present invention includes orchestrating a heap dump collection from the runtime, analyzing the dump to find the growing collection, instrumenting the runtime to uniquely label subsequent uses of that type of collection, collecting a second heap dump from the runtime, analyzing the dump to find the unique label of the growing collection, instrumenting the runtime to watch for any code paths that add to that specific growing collection, and outputting the code path which is responsible for a memory leak to a log or other output.

Existing heap analyzer or memory analyzer products are capable of performing static analysis of heap dumps or core dumps to look for large accumulations of objects referenced from a collection point in the heap. These tools can identify which objects are accumulating and where in the heap objects are accumulating, but these tools do not indicate what part of the running code is adding objects to the growing collection. The advantage of the present invention is that the proposed approach can determine the part of the running code that is adding objects to a growing collection. The proposed approach provides information that indicates to application owners what parts of their application need to be fixed.

The present invention is capable of determining which parts of the code are causing the leak without needing to wait for the server to run out of memory. The present invention accurately determines what code is adding to the growing collection when the first time the code tries to add to the collection after the detection code is in place, which makes it possible to find the code responsible for the leak very quickly. Furthermore, the present invention is capable of uniquely determining the cause of a leak by indicating the call stack of the code adding to the growing collection.

FIG. 1 is a diagram illustrating system 100 for determining origins of memory leaks in source code, in accordance with one embodiment of the present invention. System 100 includes automated process 110 of determining origins of memory leaks in source code. Automated process 110 performs the logic of the present invention. System 100 further includes target system 120 monitored for memory leaks. Target system 120 is monitored by automated process 110. System 100 further includes storage 130 that is a medium for storing files such as memory dumps and stack traces for analysis conducted by automated process 110. Automated process 110 requests target system 120 to write memory dumps on storage 130.

System 100 is implemented in one or more computing devices or servers. The one or more computing devices or servers are described in more detail in later paragraphs with reference to FIG. 3.

Figure 2:
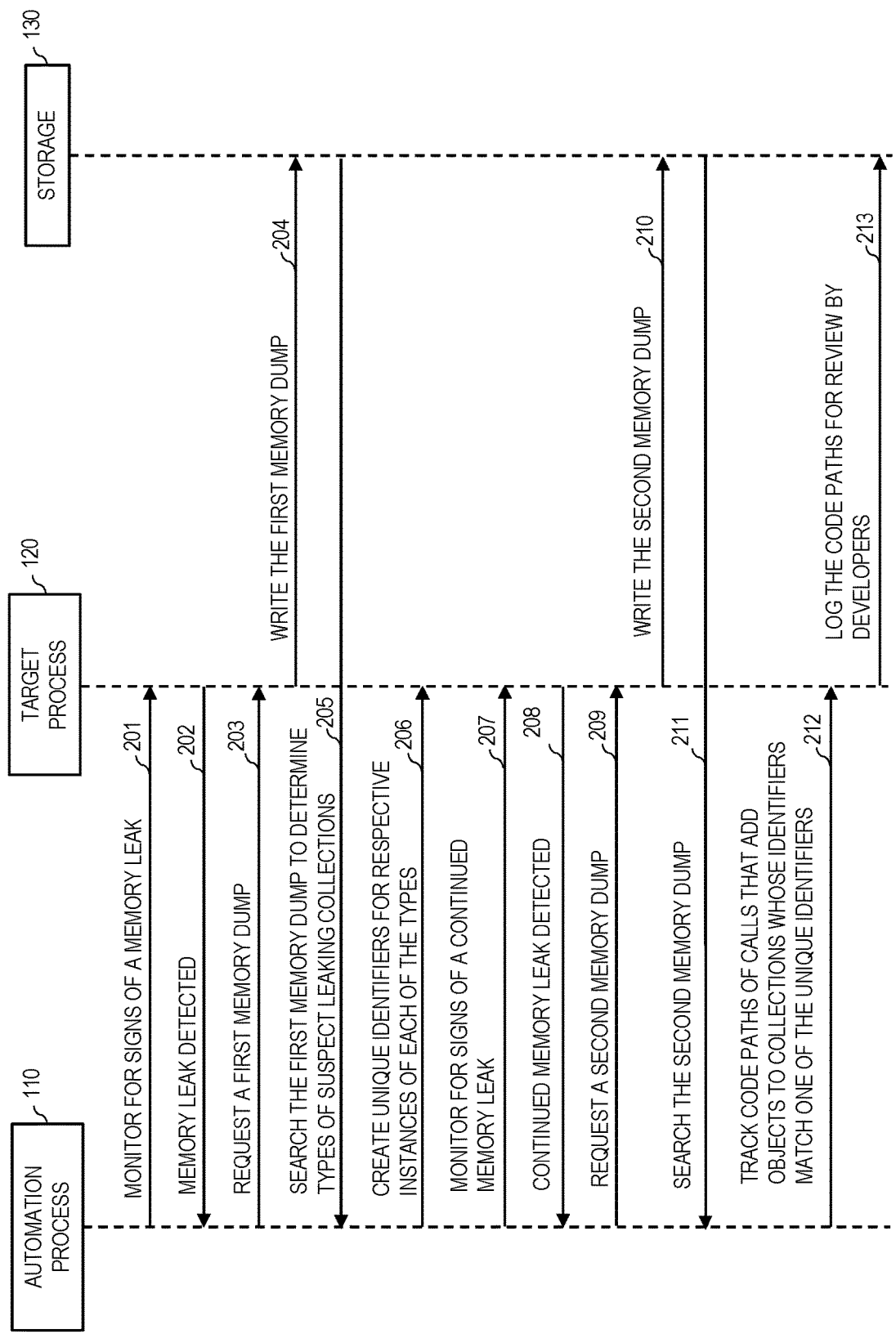
FIG. 2 is a diagram illustrating operational steps of determining origins of memory leaks in source code, in accordance with one embodiment of the present invention.

FIG. 2 is a diagram illustrating operational steps of determining origins of memory leaks in source code, in accordance with one embodiment of the present invention. In step 201, automated process 110 monitors for signs of a memory leak in target process 120. In step 202, automated process 110 detects the memory leak in target process 120.

In response to the memory leak being detected, in step 203, automated process 110 requests target process 120 to generate a first memory dump. In step 204, target process 120 writes the first memory dump on storage 130.

After the first memory dump is written on storage 130, automated process 110 retrieves the first memory dump. In step 205, automated process 110 searches the first memory dump to determine types of suspect leaking collections. A collection type, for example, may be a "Map" or a "List", etc. After the first heap dump, automated process 110 does not have enough information to uniquely identify instances of the suspect leaking collections; however, automated process 110 can identify types of the suspect leaking collections.

In step 206, automated process 110 triggers the target process 120 to create unique identifiers for respective instances of each of the types. Target process 120 adds code to methods of the suspect leaking collection types to make those methods uniquely label or identify instances of the type when a next time the methods are called for the respective instances.

In step 207, automated process 110 monitors for signs of a continued memory leak. In step 208, automated process 110 detects the continued memory leak in target process 120.

In response to the continued memory leak being detected, in step 209, automated process 110 requests target process 120 to generate a second memory dump. In step 210, target process 120 writes the second memory dump to storage 130.

After the second memory dump is written on storage 130, automated process 110 retrieves the second memory dump. In step 211, automated process 110 searches the second memory dump to determine which unique identifiers from the second memory dump (which have been created in step 206 for respective instances of each of the types) correspond to growing collection objects of the types. For example, of all instances of the "List" type objects that exist in memory in target process 120 there may only be one that is a leak suspect.

In step 212, automated process 110 triggers target process 120 to track code paths of calls that add objects to collections whose identifiers match one of the unique identifiers. Target process 120 adds code to methods of the suspect leaking collection types that add objects to a collection instance. The code determines whether the collection instance being called matches the identifier of a suspect leaking collection instance as determined in step 211. If there is a match, the code records the stack trace or code path driving a method. In step 213, on storage 130, target process 120 logs the code paths for review by developers.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 3:
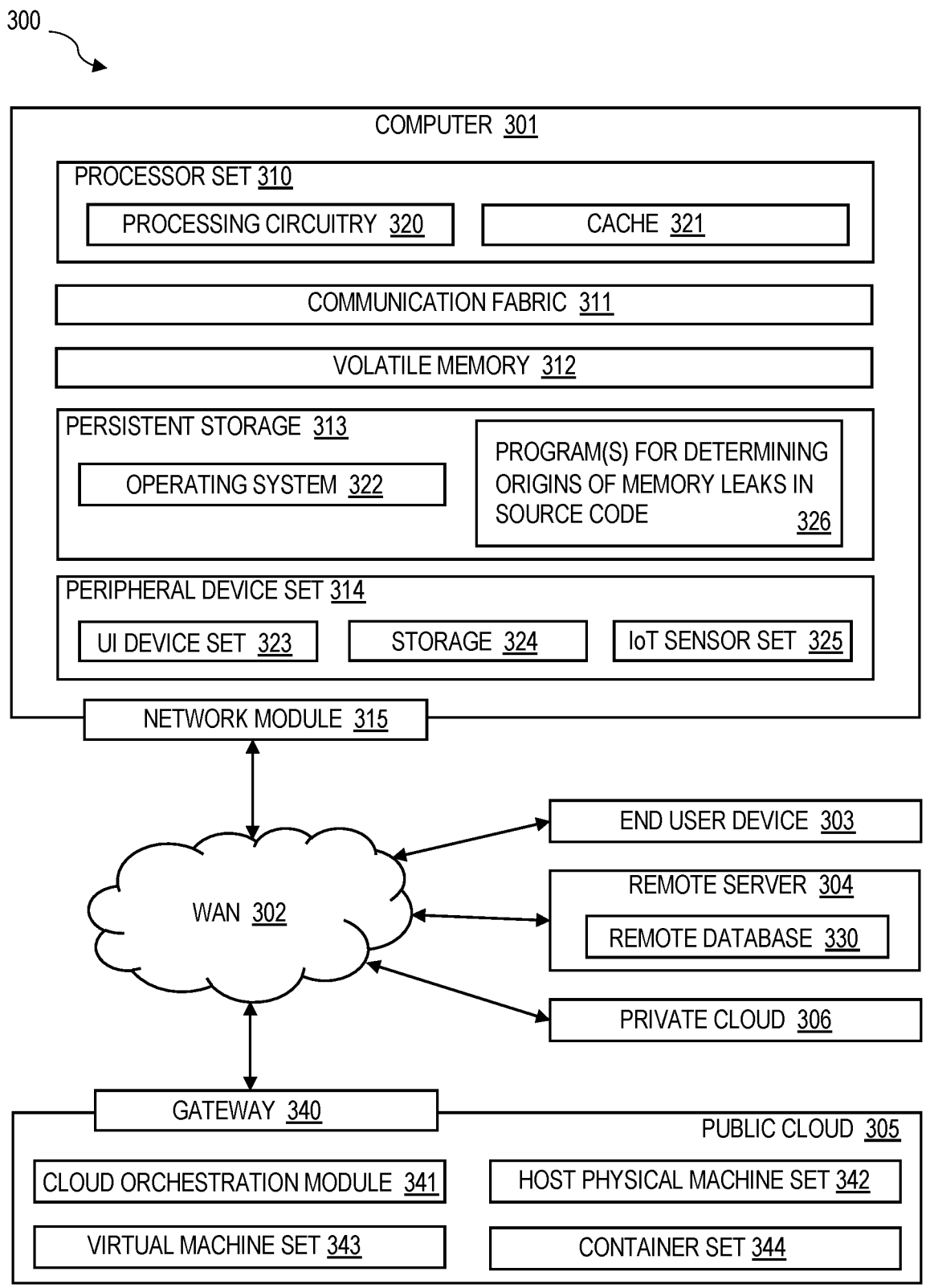
FIG. 3 is a systematic diagram illustrating an example of an environment for the execution of at least some of the computer code involved in determining origins of memory leaks in source code, in accordance with one embodiment of the present invention.

In FIG. 3, computing environment 300 contains an example of an environment for the execution of at least some of the computer code involved in performing the inventive methods, such as program(s) 326 for determining origins of memory leaks in source code. In addition to block 326, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 326, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 326 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in block 326 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

What is claimed is:

1. A computer-implemented method for determining origins of memory leaks in source code, the method comprising: in response to a memory leak being detected, writing a first memory dump; searching the first memory dump to determine types of suspect leaking collections; creating unique identifiers for respective instances of each of the types; in response to a continued memory leak being detected, writing a second memory dump; determining which unique identifiers from the second memory dump correspond to growing collection objects of the types; adding code to methods of the types of the suspect leaking collections to make the methods uniquely label the respective instances when a next time the methods are called for the respective instances; tracking code paths of calls that add objects to collections whose identifiers match one of the unique identifiers; and logging the code paths for review by developers.

2. The computer-implemented method of claim 1, further comprising:
monitoring for signs of the memory leak; and
monitoring for signs of the continued memory leak.

3. The computer-implemented method of claim 1, further comprising:
adding code to methods of suspect leaking collection types that add objects to a collection instance; and
wherein the code determines whether the collection instance being called matches an identifier of a suspect leaking collection instance.

4. The computer-implemented method of claim 1, wherein an automated process of determining the origins of the memory leaks requests a target process monitored for the memory leaks to write the first memory dump, wherein the target process writes the first memory dump on storage storing memory dumps and stack traces.

5. The computer-implemented method of claim 1, wherein an automated process of determining the origins of the memory leaks requests a target process monitored for the memory leaks to write the second memory dump, wherein the target process writes the second memory dump on storage storing memory dumps and stack traces.

6. The computer-implemented method of claim 1, wherein an automated process of determining the origins of the memory leaks requests a target process monitored for the memory leaks to log the code paths, wherein the target process logs the code paths on storage storing memory dumps and stack traces.

7. A computer program product for determining origins of memory leaks in source code, the computer program product comprising a computer readable storage medium having program instructions embodied therewith, the program instructions executable by one or more processors, the program instructions executable to: in response to a memory leak being detected, write a first memory dump; search the first memory dump to determine types of suspect leaking collections; create unique identifiers for respective instances of each of the types; in response to a continued memory leak being detected, write a second memory dump; determine which unique identifiers from the second memory dump correspond to growing collection objects of the types; add code to methods of the types of the suspect leaking collections to make the methods uniquely label the respective instances when a next time the methods are called for the respective instances; track code paths of calls that add objects to collections whose identifiers match one of the unique identifiers; and log the code paths for review by developers.

8. The computer program product of claim 7, further comprising the program instructions executable to:
monitor for signs of the memory leak; and
monitor for signs of the continued memory leak.

9. The computer program product of claim 7, further comprising the program instructions executable to:
add code to methods of suspect leaking collection types that add objects to a collection instance; and
wherein the code determines whether the collection instance being called matches an identifier of a suspect leaking collection instance.

10. The computer program product of claim 7, wherein an automated process of determining the origins of the memory leaks requests a target process monitored for the memory leaks to write the first memory dump, wherein the target process writes the first memory dump on storage storing memory dumps and stack traces.

11. The computer program product of claim 7, wherein an automated process of determining the origins of the memory leaks requests a target process monitored for the memory leaks to write the second memory dump, wherein the target process writes the second memory dump on storage storing memory dumps and stack traces.

12. The computer program product of claim 7, wherein an automated process of determining the origins of the memory leaks requests a target process monitored for the memory leaks to log the code paths, wherein the target process logs the code paths on storage storing memory dumps and stack traces.

13. A computer system for determining origins of memory leaks in source code, the computer system comprising one or more processors, one or more computer readable tangible storage devices, and program instructions stored on at least one of the one or more computer readable tangible storage devices for execution by at least one of the one or more processors, the program instructions executable to: in response to a memory leak being detected, write a first memory dump; search the first memory dump to determine types of suspect leaking collections; create unique identifiers for respective instances of each of the types; in response to a continued memory leak being detected, write a second memory dump; determine which unique identifiers from the second memory dump correspond to growing collection objects of the types; add code to methods of the types of the suspect leaking collections to make the methods uniquely label the respective instances when a next time the methods are called for the respective instances; track code paths of calls that add objects to collections whose identifiers match one of the unique identifiers; and log the code paths for review by developers.

14. The computer system of claim 13, further comprising the program instructions executable to:
monitor for signs of the memory leak; and
monitor for signs of the continued memory leak.

15. The computer system of claim 13, further comprising the program instructions executable to:
add code to methods of suspect leaking collection types that add objects to a collection instance; and
wherein the code determines whether the collection instance being called matches an identifier of a suspect leaking collection instance.

16. The computer system of claim 13, wherein an automated process of determining the origins of the memory leaks requests a target process monitored for the memory leaks to write the first memory dump and second memory dump, wherein the target process writes the first memory dump and the second memory dump on storage storing memory dumps and stack traces.

17. The computer system of claim 13, wherein an automated process of determining the origins of the memory leaks requests a target process monitored for the memory leaks to log the code paths, wherein the target process logs the code paths on storage storing memory dumps and stack traces.

\* \* \* \* \*